United States Patent
Fan et al.

(10) Patent No.: US 10,982,044 B2
(45) Date of Patent: Apr. 20, 2021

(54) LOW-SHRINKAGE POLYESTER INDUSTRIAL YARN AND PREPARATION METHOD THEREOF

(71) Applicant: JIANGSU HENGLI CHEMICAL FIBRE CO., LTD., Wujiang (CN)

(72) Inventors: Hongwei Fan, Wujiang (CN); Yiwei Shao, Wujiang (CN); Lixin Yin, Wujiang (CN); Fangming Tang, Wujiang (CN)

(73) Assignee: JIANGSU HENGLI CHEMICAL FIBRE CO., LTD., Wujiang (CN)

( * ) Notice: Subject to any disclaimer, the term of this patent is extended or adjusted under 35 U.S.C. 154(b) by 0 days.

(21) Appl. No.: 16/640,737

(22) PCT Filed: Jul. 27, 2018

(86) PCT No.: PCT/CN2018/097502
§ 371 (c)(1),
(2) Date: Feb. 21, 2020

(87) PCT Pub. No.: WO2019/114278
PCT Pub. Date: Jun. 20, 2019

(65) Prior Publication Data
US 2020/0223981 A1 Jul. 16, 2020

(30) Foreign Application Priority Data
Dec. 14, 2017 (CN) .......................... 201711340351.7

(51) Int. Cl.
*C08G 63/80* (2006.01)
*C08G 63/183* (2006.01)
*D01D 5/096* (2006.01)
*D01F 6/84* (2006.01)
*D01F 11/08* (2006.01)

(52) U.S. Cl.
CPC ............ *C08G 63/80* (2013.01); *C08G 63/183* (2013.01); *D01D 5/096* (2013.01); *D01F 6/84* (2013.01); *D01F 11/08* (2013.01)

(58) Field of Classification Search
CPC ........ D02G 3/02; D06N 3/0036; C08G 3/183; C08G 3/80; D01D 5/096; D02J 13/00; B32B 27/36; D01F 6/92; D01F 6/84; D01F 8/14; D01F 11/08; D10B 2331/04; D06M 2101/32; D06M 13/295; C08L 67/02; C08L 67/06; C08L 2203/12
USPC ..... 428/401, 364, 394, 395; 528/302, 308.6, 528/271; 524/604

See application file for complete search history.

(56) References Cited

FOREIGN PATENT DOCUMENTS

| CN | 101063236 A | 10/2007 |
|----|-------------|---------|
| CN | 102030893 A | 4/2011 |
| CN | 106400165 A | 2/2017 |
| CN | 108130609 A | 6/2018 |

*Primary Examiner* — Camie S Thompson
(74) *Attorney, Agent, or Firm* — Bayramoglu Law Offices LLC

(57) ABSTRACT

A low-shrinkage polyester industrial yarn and a preparation method thereof are provided. The preparation method includes the following steps: subjecting the modified polyester to polycondensation, melting, measuring, extruding, cooling, oiling, stretching, heat setting and winding, wherein the content of the crown ether in the oil agent is 67.30-85.58 wt %. The material of the prepared low shrinkage polyester industrial yarn is a modified polyester, the molecular chain of the modified polyester includes a terephthalic acid segment, an ethylene glycol segment, and a branched diol segment, and the structural formula of the branched diol is as follows:

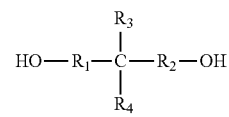

Wherein $R_1$ and $R_2$ are each independently selected from a linear alkylene group having 1-3 carbon atoms, $R_3$ is selected from an alkyl group having 1-5 carbon atoms, and $R_4$ is selected from an alkyl group consisting of 2-5 carbon atoms.

15 Claims, No Drawings

LOW-SHRINKAGE POLYESTER INDUSTRIAL YARN AND PREPARATION METHOD THEREOF

CROSS REFERENCE TO THE RELATED APPLICATIONS

This application is the national phase entry of International Application No. PCT/CN2018/097502, filed on Jul. 27, 2018, which is based upon and claims priority to Chinese Patent Application No. 201711340351.7, filed on Dec. 14, 2017, the entire contents of which are incorporated herein by reference.

TECHNICAL FIELD

This invention belongs to the technical field of fiber production, and more particularly, relates to a low-shrinkage industrial yarn and its preparation method.

BACKGROUND

Since the invention of polyethylene terephthalate (PET) fiber, it has been rapidly developed due to its excellent performance, and its output has become the world's finest synthetic fiber. Polyester fiber has a series of excellent properties such as high breaking strength, high modulus of elasticity, moderate resilience, excellent heat setting performance, good heat and light resistance, and good resistance to acid, alkali and corrosion, and the fabric prepared therefrom has wrinkle resistance. It has been widely used in the fields of fiber, bottle packaging, film and sheet, etc. The output is increasing year by year, and the industry status is significantly improved.

However, in the process of the polycondensation reaction of synthetic ethylene terephthalate, especially in the formation of linear high polymers, linear and cyclic oligomers are also associated due to high temperature oxidative degradation, and cyclic oligomers are in polycondensation. At the stage, due to the uncoiling of the macromolecular chain end, about 70% of the cyclic oligomers are cyclic trimers, and the cyclic trimer has easy aggregation, easy crystallization, high chemical and thermal stability. Characteristics, the formation of cyclic trimer will have the following effects on polyester processing: (1) will cause clogging of the spinning assembly, affect the service life of the melt filter and components; (2) will precipitate during the fiber heat setting process, Deposited on the heating roller, causing increased friction and uneven heating; (3) The dyeing process will be centred on the cyclic trimer, so that the dye will aggregate and adhere to the surface of the fiber, and dye spots, stains and stains appear on the surface of the fiber. Colouring and other phenomena affect the feel and colour of the fabric woven from it, while the cyclic oligomers filled with pipes and valves limit the normal flow velocity of the melt, resulting in uneven dyeing of the fibers and poor reproducibility; 4) Adhesion to the fiber table The surface causes difficulty in winding, and the phenomenon of yarn breakage and uneven thickness affects the mechanical properties such as breaking strength and elongation at break of the fiber, which seriously affects product quality.

Since most PET fibers have a small dielectric constant, a low moisture regains and a high coefficient of friction, a spinning oil must be used in the spinning process. The main component of the oil agent is a surfactant, which can form a directional adsorption layer on the surface of the chemical fiber, that is, an oil film. On the one hand, the hydrophilic group of the oil film faces the space, adsorbs moisture in the air, and forms a continuous surface on the fiber surface. The water film causes the charged ions to move on the migration, which reduces the accumulation of static charges generated by the friction between the fibers, thereby reducing the surface resistance of the fibers and increasing the electrical conductivity of the fibers. On the other hand, the oil film isolating fibers. It can produce a certain affinity for the fiber, so that it has a certain bunching property without being scattered. In addition, the oil film also imparts a certain smoothness to the fiber, so that the fiber is not damaged during the rubbing process, and has a good hand feeling. In the spinning process, it can smoothly pass through the winding, stretching, drying and other operation steps, eliminating the electrostatic action during the textile processing process, preventing the occurrence of undesirable phenomena such as aprons, rollers, and cylinders, reducing the filaments and broken ends. The production guarantees the quality of the fiber products.

Since the oil film on the surface of the fiber is broken at high temperature, high speed and a certain pressure, the friction behaviour of the fiber will be changed, resulting in an increase in friction, resulting in other problems such as filaments, breakage, etc., the higher the strength of the oil film, the more difficult it is to break, the more It is beneficial to the spinnability of the fiber. When the oil agent is uniformly adsorbed on the surface of the fiber, the oil film is uniformly distributed on the surface. The oil film spreads rapidly and evenly after the fiber is stretched. If the viscosity of the oil agent is too high, it is not conducive to The oil is dispersed to form a uniform oil film. With the development of high-speed, ultra-high-speed and multi-functional fiber of polyester filament, it is of practical significance to develop an oil agent with good heat resistance, low viscosity, high oil film strength, good smoothing performance and strong anti-static property.

At present, there are two main problems in the preparation of low-shrinkage polyester industrial yarn. First, the oil agent volatilizes quickly and is easy to bond on the fiber surface, resulting in higher fiber unevenness and poor performance. The volatilization of the oligomer in the fiber remains on the surface of the spinneret, causing the fiber filaments to affect the quality of the fiber.

Therefore, how to provide a method for preparing a low-shrinkage polyester industrial yarn having a uniform spinning and a low oligomer content has become an urgent problem to be solved.

SUMMARY

The object of the present invention is to overcome the problem that the prior art oil agent volatilizes easily on the surface of the fiber and the fiber unevenness and excessive residual oligomer in the spinneret affect the fiber quality, and provides a spinning. Low shrinkage type polyester industrial yarn with uniform and low oligomer content and preparation method thereof. The introduction of the branched diol in the modified polyester of the invention reduces the cyclic oligomer produced in the polyester side reaction and improves the quality of the fiber; the use of the crown ether improves the oil agent's heat resistance and lubricity which can improve the quality of the fiber. Because the crown ether has lower viscosity than the conventional smoothing agent, higher volatilization point, the friction coefficient of the crown ether-containing oil agent is smaller and the heat resistance is more excellent. Sex, which improves the processing properties of the fiber and reduces the appearance of the wool phenomenon.

In order to achieve the above object, the technical solution adopted by the present invention is:

A low-shrinkage polyester industrial yarn, the low-shrinkage polyester industrial yarn is made of a modified polyester, and the molecular chain of the modified polyester includes a terephthalic acid segment, an ethylene glycol segment, and a branched chain. The structural formula of the diol segment, the branched diol is as follows:

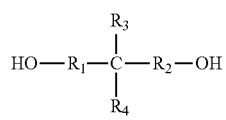

wherein R1 and R2 are each independently selected from a linear alkylene group having 1 to 3 carbon atoms, R3 is selected from an alkyl group having 1 to 5 carbon atoms, and R4 is selected from the group consisting of 2 to 5 carbon atoms. The purpose of the alkyl group and the number of carbon atoms is defined: the introduction of the branched structure and the long-chain structure in the diol causes the electronegativity of the alkoxy moiety to be weakened, and the number of carbon atoms in the branched structure is too small. The electronegativity effect of the oxy moiety is small, and it has little meaning for reducing the generation of the cyclic oligomer; if the number of carbon atoms in the branched structure is too large, entanglement between molecules will occur, which affects the distribution of molecular weight;

The dry shrinkage of the low-shrinkage polyester industrial yarn is 2.5 to 4.7% at the temperature of 190° C., for 15 min and 0.01 cN/dtex.

As a Preferred Technical Solution:

The low-shrinkage polyester industrial yarn has a fineness of 550 to 4400 dtex, a linear density deviation rate of ±1.5%, a breaking strength of is larger than 7.0 cN/dtex, and a breaking strength CV. The value is lower than 3.0%, the center value of elongation at break is 19.0-21.0%, the elongation at break is ±2.0%, the elongation at break CV is lower than 8.0%, the network is 4-9/m, and the oil content is 0.60±0.20%. The elongation at break CV value is small, indicating that the product has good uniformity and high fiber quality.

A low-shrinkage polyester industrial yarn as described above, wherein the content of the cyclic oligomer in the modified polyester is lower than 0.6% by weight, and the present invention significantly reduces the formation of the cyclic oligomer relative to the prior art. the amount;

The modified polyester has a number average molecular weight of 20,000 to 27,000 and a molecular weight distribution index of 1.8 to 2.2. The modified polyester has a relatively high molecular weight and a narrow molecular weight distribution, which can meet the requirements of spinning processing and is advantageous for preparation performance. Excellent fiber;

The molar content of the branched diol segment in the modified polyester is 3 to 5% of the molar content of the terephthalic acid segment, and the mole of the branched diol segment in the modified polyester the lower content is beneficial to maintain the excellent performance of the polyester itself;

The branched diol is 2-ethyl-2-methyl-1,3-propanediol, 2,2-diethyl-1,3-propanediol, 2-butyl-2-ethyl-1,3-propanediol, 3,3-diethyl-1,5-pentanediol, 4,4-diethyl-1,7-heptanediol, 4,4-di(1,-methylidene) 1,7,7-heptanediol, 3,3-dipropyl-1,5-pentanediol, 4,4-dipropyl-1,7-heptanediol, 4-methyl-4-(1,1-dimethylethyl)-1,7-heptanediol, 3-methyl-3-pentyl-1,6-hexanediol or 3,3-dipentyl-1,5-pentylene diol.

The low-shrinkage polyester industrial yarn as described above, wherein the modified polyester is prepared by uniformly mixing terephthalic acid, ethylene glycol and the branched diol, followed by esterification. The reaction and the polycondensation reaction give a modified polyester; the specific preparation steps of the modified polyester are as follows:

(1) An Esterification Reaction;

The terephthalic acid, the ethylene glycol and the branched diol are slurried, and the catalyst and the stabilizer are uniformly mixed, and then the esterification reaction is carried out under a nitrogen atmosphere, and the pressure is normal pressure. 0.3 MPa, the temperature of the esterification reaction is 250 to 260° C., and the end point of the esterification reaction when the water distillation amount in the esterification reaction reaches 90% or more of the theoretical value;

(2) Polycondensation Reaction;

After the end of the esterification reaction, the polycondensation reaction in the low vacuum stage is started under the condition of negative pressure. The pressure in this stage is smoothly pumped from normal pressure to the absolute pressure below 500 Pa in 30 to 50 min, the reaction temperature is 260 to 270° C., and the reaction time is 30 to 50 min, then continue to vacuum, the polycondensation reaction in the high vacuum stage, the reaction pressure is further reduced to the absolute pressure below 100 Pa, the reaction temperature is 275 to 285° C., the reaction time is 50 to 90 min, the modified polyester is obtained.

In the low shrinkage type polyester industrial yarn as described above, in the step (1), the molar ratio of the terephthalic acid, the ethylene glycol and the branched diol is 1:1.2 to 2.0:0.03 to 0.06. The catalyst is added in an amount of 0.01 to 0.05% by weight of the terephthalic acid, and the stabilizer is added in an amount of 0.01 to 0.05% by weight of the terephthalic acid;

The catalyst is antimony trioxide, ethylene glycol antimony or antimony acetate, and the stabilizer is triphenyl phosphate, trimethyl phosphate or trimethyl phosphite.

The invention also provides a method for preparing a low shrinkage polyester industrial yarn as described above, which is characterized by solid phase polycondensation, thickening, melting, metering, extruding, cooling, oiling, pulling Stretching, heat setting and winding to produce low shrinkage polyester industrial yarn;

The oil agent for oiling contains crown ether, and the content of crown ether is 67.30 to 85.58 wt %. The content of crown ether in the oil agent of the invention needs to be kept within a certain range, and the amount of crown ether added is too low to be The oil agent having low viscosity, good heat resistance and high oil film strength is obtained, and if the crown ether is added too much, other performance indexes of the oil agent will be affected.

A crown ether is a heterocyclic organic compound containing a plurality of ether groups. The wetting ability of the crown ether surfactant is larger than that of the corresponding open-chain compound, and the crown ether has better solubilization. The solubility of the salt compound in the organic compound is lower, but the organic compound of the salt compound is added with the crown ether. The solubility is improved. Ordinary polyester compounds or polyethers in oils, due to the large molecular weight and hydrogen bonding, the interaction between molecules is greater, showing a higher kinematic viscosity. After the addition of crown ether, the crown ether is better compatible with In the polyester compound or polyether oil system, the polyester compound or the polyether molecular chain is inserted to shield the interaction between the molecular chains, thereby causing the viscosity of the oil system to decrease. At the same time, antistatic agents for chemical fiber oils are mainly classified into anionic, cationic and amphoteric surfactants, most of which contain metal ions or exist in the form of salts, which make polyester compounds or polyethers in antistatic agents and oils. The compatibility of the class is poor, and the addition of the crown ether improves the compatibility of the antistatic agent with the polyester compound or the polyether due to the salt dissolution effect, thereby improving the strength of the oil film, which is stable to the spinning. Sex and product holdings have greater significance. The index of the oil agent is a comprehensive factor, so it imposes certain restrictions on the amount of crown ether added. Too low is not enough for the heat resistance of the oil agent and the strength of the oil film. Too many other indicators will be limited.

When the oil agent is used, it is disposed in water to a concentration of 14 to 18% by weight of the emulsion; the concentration of the emulsion can be adjusted according to the actual application.

As a Preferred Technical Solution:

According to the method as described above, the intrinsic viscosity of the modified polyester after solid phase polycondensation and viscosity-increasing is 1.0 to 1.2 dL/g; the intrinsic viscosity is a characteristic mode of molecular weight, the intrinsic viscosity is too high, and the subsequent processing temperature is increased. The product is prone to thermal degradation; if the intrinsic viscosity is too low, it is difficult to achieve the required strength and performance;

The replacement period of the spinning assembly is longer than 40 days; the longer the replacement period of the assembly, the better the stability of the product, the lower the production cost and the higher the economic efficiency.

As described above, the oil agent has a thermal weight loss of less than 15% by weight after heat treatment at 200° C. for 2 hours, the crown ether has a higher volatile point and excellent heat stability, and the heat resistance of the oil after the introduction of the crown ether Also achieved significant improvements;

The oil has a kinematic viscosity of 27.5-30.1 mm$^2$/s at (50±0.01) ° C., and the kinematic viscosity of the oil after being formulated into a concentration of 10 wt % is 0.93-0.95 mm$^2$/s, crown ether The ability to reduce the viscosity of the oil is mainly due to the lower viscosity of the crown ether itself and the beaded small molecule. After the introduction of the crown ether in the oil system, the crown ether is better compatible with the polyester compound or the polyether compound. In the oil system, simultaneously entering the molecular chain of the polyester compound or the polyether compound, shielding the force between the molecular chains, thereby reducing the viscosity of the oil system;

The oil film strength of the oil agent is 121-127N. In the prior art, the oil film strength of the oil agent is relatively low, generally about 110N, which is mainly because the antistatic agent of the chemical fiber oil agent mostly contains metal ions or exists in the form of salt. The compatibility between the antistatic agent and the polyester compound or the polyether compound in the oil agent is poor, and the crown ether can improve the oil film strength mainly due to the salt dissolution effect after the addition of the crown ether, and the antistatic agent and the polyester compound are improved. The compatibility of the compound or polyether, thereby increasing the strength of the oil film;

The surface tension of the oil agent is 23.2-26.8 cN/cm, and the specific resistance is $1.0 \times 10^8$-$1.8 \times 10^8$ Ω·cm;

After oiling, the static friction coefficient between fiber and fiber is 0.250-0.263, and the dynamic friction coefficient is 0.262-0.273;

After oiling, the coefficient of static friction between fiber and metal is 0.202-0.210, and the coefficient of dynamic friction is 0.320-0.332.

The crown ether is 2-hydroxymethyl-12-crown-4,15-crown-5 or 2-hydroxymethyl-15-crown-5;

The oil agent further comprises mineral oil, potassium phosphate salt, trimethylolpropane laurate and sodium alkyl sulfonate;

The mineral oil is one of mineral oils of 9 #-17 #;

The potassium phosphate salt is a potassium salt of lauryl phosphate, an isomeric tridecyl polyoxyethylene ether phosphate potassium salt or a tetradecyl alcohol phosphate potassium salt;

The sodium alkyl sulfonate is sodium dodecyl sulfate, sodium pentadecyl sulfonate or sodium hexadecyl sulfonate.

In the method as described above, the oil preparation method is as follows: the crown ether is mixed with the potassium phosphate salt, the trimethylolpropane laurate and the sodium alkylsulfonate, and then added to the mineral oil to obtain an oil. The amount of each component added is as follows:

Mineral oil 0-10 parts;
Trimethylolpropane laurate 0-20 parts;
Crown ether 70-100 parts;
Phosphate potassium salt 8-15 parts;
Sodium alkyl sulfonate 2-7 parts;

The mixing is carried out at a normal temperature, and the stirring temperature is 40 to 55° C., and the time is 1 to 3 hours.

As described above, the spinning process parameters of the low shrinkage polyester industrial yarn are as follows:

The temperature of each zone of the screw is 290-320° C.;
The temperature of the cabinet is 295-300° C.;
Head pressure 170±5 Bar;
Side blowing temperature 23±2° C.;
Side blowing humidity 80±5%;
Side blowing air velocity 0.55±0.10 m/s;
Pre-network pressure 0.16±0.02 MPa;
Network pressure 0.20±0.02 MPa;
Winding speed 2600-3400 m/min;
The process parameters for stretching and heat setting are:
GR (Godet Roller)-1 speed 500-600 m/min;
GR-2 speed 520-1000 m/min; GR-2 temperature 80-100° C.;
GR-3 speed 1800-2500 m/min; GR-3 temperature 100-150° C.;
GR-4 speed 2800-3500 m/min; GR-4 temperature 200-250° C.;
GR-5 speed 2800-3500 m/min; GR-5 temperature 200-250° C.;
GR-6 speed 2600-3400 m/min; GR-6 temperature 150-220° C.

Invention Mechanism:

The invention firstly adopts a modified polyester comprising a terephthalic acid segment, an ethylene glycol segment and a branched diol segment, and then the modified polyester is subjected to solid phase polycondensation to thicken, melt, measure, extrusion, cooling, oiling, drawing, heat setting and winding to obtain low shrinkage polyester industrial yarn, the oil for oiling contains crown ether, and the content of crown ether is 67.30-85.58 wt %, wherein The effect of modified polyester and oil on the properties of the finally obtained low-shrinkage-type polyester industrial yarn is as follows: the addition of modified polyester reduces the formation of cyclic oligomers, and on the other hand, improves the use of components. Lifetime, on the other hand, improves the uniformity of the fiber; the use of an oil containing a crown ether increases the stability of the spinning, thereby further improving the quality of the fiber.

In an organic compound, the angle between two chemical bonds formed by the same atom in a molecule is called a bond angle, and the bond angle is usually expressed by a degree. The electronegativity of a central atom and a coordinating atom in an organic compound molecule affects the bond of the molecule angle. When the electronegativity of the coordination atom bonded to the central atom increases, the electron-withdrawing ability of the coordination atom increases, and the bonding electron pair will move toward the ligand, which is far from the central atom, causing the bond to repulsively Decreasing and close to each other, so that the bond angle is also reduced. Conversely, when the electronegativity of the coordinating atom bonded to the central atom is reduced, the electron-donating ability of the coordinating atom is enhanced, and the bonding electron pair will be toward the central atom. The direction moves closer to the center atom, causing the bond pairs to move away from each other due to the increased repulsive force, and the bond angle also increases.

According to Pauling's electronegativity scale, the electronegativity of C, H and O atoms are 2.55, 2.20 and 3.44, respectively. According to the valence electron energy balance theory, the calculation formula of the group electronegativity is as follows:

$$\chi_{ve}(G) = \frac{\sum n_i \chi_i N_{ve,i}}{\sum n_i N_{ve,i}};$$

Where $\chi_i$ is the electronegativity of the neutral atom of the i atom before bonding, $N_{ve,i}$ is the number of valence electrons in the i atom, and $n_i$ is the number of i atoms in the molecule. The calculation steps for the more complex group electronegativity are mainly: first calculate the electronegativity of the simple group, then treat the simple group as a quasi-atom and then calculate the electronegativity of the more complex group, so that iteratively, finally, the electronegativity of the target group is obtained. It should be noted that, in calculating the electronegativity of a quasi-atom, a valence electron that is not bonded in a base atom (for example, a base atom of a group —OH is an O atom) is regarded as a valence electron of a quasi-atom.

In the present invention, the CO bond of the carboxyl group in the terephthalic acid is broken, and the C atom combines with the O atom of the hydroxyl group in the diol to form a new CO bond in the ester group, the C atom in the ester group and the C atom on the benzene ring. The bond angle between the formed bond CC and the newly formed chemical bond CO is denoted by a, and the change of the bond angle α affects the ring-forming reaction. When a is less than 109°, the molecule is liable to form a ring, and as a increases, the molecule becomes the chance of the ring will drop. The present invention introduces a branched diol having the formula:

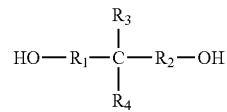

Wherein R1 and R2 are each independently selected from a linear alkylene group having 1 to 3 carbon atoms, R3 is selected from an alkyl group having 1 to 5 carbon atoms, and R4 is selected from the group consisting of 2 to 5 carbon atoms. alkyl. Due to the introduction of the branched structure and the long-chain structure, the diol structure will weaken the electronegativity of the alkoxy moiety, and the calculation formula of the electronegativity of the group can also be used to obtain the diol structure and the diacid. The electronegativity of the carbonyl-linked group is between 2.59 and 2.79, and the electronegativity of the group —OCH2CH2- in the ethylene glycol to the carbonyl group in the diacid is 3.04, so that the alkoxy group is in the ethylene glycol. —OCH2CH2- has a stronger electron donating property, so that the pair of bonded electrons on the newly formed chemical bond CO bond will move toward the center C atom, closer to the central atom, causing the bond pairs to increase due to repulsion Keeping away, and thus the bond angle α is greater than 109o, the probability of generating a linear polymer is increased, thereby reducing the generation of the cyclic oligomer, facilitating the elimination of the phenomenon of broken filaments and unevenness of the thickness, and is advantageous for increasing the breaking strength of the fiber and reducing Unevenness, which improves product quality.

The invention obtains an oil agent with low viscosity, good heat resistance and high oil film strength by introducing crown ether into the oil agent. The higher viscosity of the oil agent in the prior art is mainly due to the fact that the oil agent contains ordinary polyester compounds or polyether compounds. Due to the large molecular weight and hydrogen bonding, the intermolecular effect of the compounds is manifested as kinematic viscosity. Larger, thus resulting in higher viscosity of the oil agent, the viscosity of the oil agent can be significantly reduced after the addition of the crown ether, mainly because the crown ether itself has a low viscosity and is a beaded small molecule, the crown ether is better compatible with the polyether. In the ester compound or polyether oil system, the molecular chain between the polyester compound or the polyether compound is simultaneously inserted to shield the interaction between the molecular chains, thereby reducing the viscosity of the oil system. The lower oil film strength of the oil agent in the prior art is mainly due to the fact that the antistatic agent of the chemical fiber oil agent mostly contains metal ions or exists in the form of a salt, which results in compatibility of the antistatic agent with the polyester compound or polyether in the oil agent. The poorness of the crown ether can increase the strength of the oil film mainly due to the salt-solubility effect of the crown ether, the compatibility of the antistatic agent with the polyester compound or the polyether, and the strength of the oil film. In addition, the crown ether has higher volatilization point and excellent heat stability, and the heat resistance of the oil after the introduction of the crown ether is also significantly improved, because the crown ether has a lower viscosity and a higher volatilization point. The crown-containing ether oil agent has a small friction coefficient and excellent heat resistance stability, thereby improving the processing property of the fiber.

The addition of the modified polyester in the invention reduces the formation of the cyclic oligomer, on the one hand, improves the service life of the assembly, on the other hand, improves the stability of the spinning and improves the uniformity of the fiber; The use of the oil agent further increases the stability of the spinning and improves the quality of the fiber.

Beneficial Effects:

(1) A low-shrinkage polyester industrial yarn of the present invention has a simple and rational preparation process, and the obtained polyester industrial yarn has the advantages of low dry heat shrinkage rate;

(2) A method for preparing a low-shrinkage polyester industrial yarn of the present invention, by introducing a branched diol into the modified polyester, changing the bond angle of the polyester molecule, thereby significantly reducing the polyester Production of cyclic oligomers during synthesis;

(3) A method for preparing a low-shrinkage polyester industrial yarn of the present invention, wherein the oil-containing agent containing a crown ether used in the oiling process has low viscosity, good heat resistance, high oil film strength, good smoothness and resistance The strong electrostatic properties improve the stability of the spinning and the processing properties of the fiber.

DETAILED DESCRIPTION OF THE EMBODIMENTS

Hereinafter, the present invention will be described in more detail by the following examples. It should be noticed that these examples are only for illustrating the present invention and are not intended to limit the scope of the present invention. In addition, it should be noticed that after reading the content of the present invention, those skilled in this field can make various modifications or changes to the present invention, and these equivalent forms also apply to the scope of the appended claims of this application.

A preparation method of low-shrinkage polyester industrial yarn comprises:

(1) Preparation of Modified Polyester:

a. esterification reaction; prepare a slurry from terephthalic acid, ethylene glycol and branched diol with the molar ratio of A'. Uniformly add catalyst, flatting agent and stabilizer and perform esterification reaction in the nitrogen environment with the pressure increased by B'. The temperature of esterification reaction is C. The esterification reaction ends when the distilled water reaches the theoretical value of D'. The quantity of catalyst is E of the weight of terephthalic acid, and the flatting agent is F of the weight of terephthalic acid, and the stabilizer is G of the weight of terephthalic acid.

b. polycondensation reaction; after the esterification reaction, start the low vacuum stage of polycondensation from the negative pressure during which the pressure in H is pumped from atmospheric pressure to absolute pressure I, the reaction temperature is J, the reaction time is K, and then continue to pump to vacuum and enter the high vacuum stage. Decrease the pressure to absolute pressure L', the reaction temperature is M, the reaction time is N, and modified polyester is prepared. The molecular chain of the modified polyester includes terephthalic acid segment, ethylene glycol segment and branched diol segment. The content of the cyclic oligomer in the modified polyester is O, the number average molecular weight is P, the molecular weight distribution index is Q, and the molar content of the branched diol segment in the modified polyester is R of molar content of the terephthalic acid segment.

(2) The preparation of oil agent; the crown ether is mixed with the potassium phosphate salt, the trimethylolpropane laurate and the sodium alkyl sulfonate at room temperature, and then add the mixture to the mineral oil and uniformly stirred at t1 for t2 to obtain an oil agent. In terms of parts by weight, the components are added in the following amounts: mineral oil added is a1; trimethylolpropane laurate added is a2; crown ether added is a3; phosphate potassium salt added is a4; sodium alkyl sulfonate added is a5. The prepared oil has a crown ether content of b, and the oil agent has excellent high temperature resistance. The heat loss after heat treatment at 200° C. for 2 hours is b2 wt %; the viscosity of the oil agent is low, at (50±0.01) ° C., The kinematic viscosity is b3, and the kinematic viscosity of the emulsion with the concentration of 10 wt % by using water is b4; the oil film strength is high, the oil film strength is c1, the surface tension of the oil agent is c2, the specific resistance is c3, after oiling the static friction coefficient between the fiber and the fiber is $\mu_s$, the dynamic friction coefficient is $\mu_d$, the static friction coefficient between the fiber and the metal is $\mu_{s1}$, and the dynamic friction coefficient is $\mu_{d1}$. When the prepared oil agent is used, the emulsion is set to a concentration of d by using water.

(3) The low-shrinkage polyester industrial yarn is prepared by subjecting the modified polyester to solid phase polycondensation and tackifying, melting, measuring, extruding, cooling, oiling, drawing, heat setting and winding, wherein the intrinsic of the modified polyester after solid phase polycondensation tackifying is E0. The replacement period of the spinning assembly is e. The spinning process's parameters of the low shrinkage polyester industrial yarn are as follows: the temperature of each zone of the screw is T1; the temperature of the box is T2; the pressure of the head is P1; The side blowing temperature is T2'; the side blowing humidity is W1; the side blowing wind speed is V2; the pre-network pressure is P0, the network pressure is P2, and the winding speed is V3; the stretching and heat setting process's parameters are: GR-1 speed It is V4; GR-2 speed is V5; GR-2 temperature is T3; GR-3 speed is V6; GR-3 temperature is T4; GR-4 speed is V7; GR-4 temperature is T5; GR-5 speed is V8; GR-5 temperature is T6; GR-6 speed is V9; GR-6 temperature is T7.

The product of low-shrinkage polyester industrial yarn has a fineness of D1, a linear density deviation rate of D2, a breaking strength of Y1, a breaking strength CV value of Y2, an elongation at break center value of Y3, and an elongation at break elongation rate. Y4, the elongation at break CV value is Y5, the network quantity is Z1/m, the oil content is Z2, and the dry heat shrinkage rate at 190° C., 15 min and 0.01 cN/dtex is Z3.

A method for preparing a branched diol by reacting A1, A2 and triethylamine in a nitrogen atmosphere at T0° C. for 20 min, and then adding the concentrate to a hydrogenation reactor having a Raney Nickel catalyst. The reaction is carried out at a hydrogen pressure of 2.914 MPa and at 100° C. After the reaction is completed, the catalyst is precipitated after cooling, and the solution is treated with an ion exchange resin, and then distilled under reduced pressure, separated, and purified to obtain a branched diol.

Example 1

A method for preparing low-shrinkage polyester industrial yarn, comprising the steps:

(1) Preparation of modified polyester, wherein A' is 1:1.2: 0.03, the catalyst is antimony trioxide, the matting agent is titanium dioxide, the stabilizer is triphenyl phosphate, B' is atmospheric pressure, C is 250° C., D' 90%, E is 0.01%, F is 0.20%, G is 0.05%, H is 30 min, I is 500 Pa, J is 260° C., k is 40 min, L' is 100 Pa, M is 275° C., N is 70 min, O is 0.6 wt %, P is 20,000, Q is 2.0, R is 3%, and the branched diol is 2-ethyl-2-methyl-1,3-propanediol, and the structural formula is as follows:

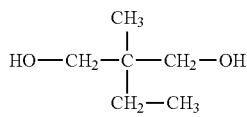

(2) Preparation of oil agent, wherein the crown ether is 2-hydroxymethyl-12-crown-4, the potassium phosphate salt is potassium dodecyl phosphate, and the sodium alkyl sulfonate is dodecyl sulfonic acid. Sodium, mineral oil is 9 # mineral oil, t1 is 40° C., t2 is 1 h, a1 is 2 parts; a2 is 10 parts; a3 is 90 parts; a4 is 8 parts; a5 is 3 parts; B is 79.6 wt %, b2 is 14.5 wt %; b3 is 29.6 mm$^2$/s, b4 is 0.93 mm$^2$/s; c1 is 125N, c2 is 24.8 cN/cm, c3 is 1.3×10$^8$ Ω·cm, $\mu_s$ is 0.255, $\mu_d$ is 0.266, $\mu_{s1}$ is 0.203, $\mu_{d1}$ is 0.320, d is 15 wt %

(3) Modified polyester is subjected to solid phase polycondensation to thicken, melt, measure, extrusion, cooling, oiling, drawing, heat setting and winding to obtain low shrinkage polyester industrial yarn, wherein E0 is 11 dL/g, e is 44 days. The spinning parameters of low-shrinkage polyester industrial yarn, wherein T1 is 310° C., T2 is 297° C., P1 is 170 Bar, T2' 23° C., W1 is 80%, V2 is 0.5 m/s, P0 is 0.16 MPa, P2 is 0.21 MPa, P2 is 0.21 MPa, V3 is 3000 m/min; the process parameters of stretching and heat setting are: V4 is 530 m/min; V5 is 750 m/min; T3 is 90° C.; V6 is 2100 m/min; T4 is 130° C.; V7 It is 3200 m/min; T5 is 230° C.; V8 is 3200 m/min; T6 is 235° C.; V9 is 3000 m/min; and T7 is 180° C.

The finally obtained low shrinkage polyester industrial yarn, wherein D1 is 1500 dtex, D2 is −0.1%, Y1 is 7.7 cN/dtex, Y2 is 2.7%, Y3 is 20.3%, Y4 is −0.11%, and Y5 is 7.3%. Z1 is 7/m, Z2 is 0.8%, and Z3 is 4.7%.

Example 2

A method for preparing low-shrinkage polyester industrial yarn, comprising the steps:

(1) Preparation of a modified polyester, wherein A' is 1:1.3:0.04, the branched diol is 2,2-diethyl-1,3-propanediol, and the catalyst is ethylene glycol antimony, The matting agent is titanium dioxide, the stabilizer is trimethyl phosphate, B' is atmospheric pressure, C is 260° C., D' is 91% E is 0.02%, F is 0.21%, G is 0.03%, H is 35 min, I is 490 Pa, J is 261° C., k is 30 min, L' is 100 Pa, M is 277° C., N is 85 min, 0 is 0.6 wt %, P is 27000, Q is 1.8, R is 5%, 2, 2-2 The structural formula of 1,3-propanediol is as follows:

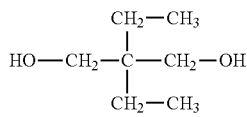

(2) Preparation of oil agent, wherein the crown ether is 15-crown-5, the phosphate potassium salt is isomeric tridecyl polyoxyethylene ether phosphate potassium salt, the alkyl sulfonate sodium is pentadecyl sulfonate, and the mineral oil is 10 # mineral oil. t1 is 48° C., t2 is 3 h, a1 is 8 parts; a2 is 10 parts; a3 is 85 parts; a4 is 11 parts; a5 is 5 parts; b is 70.83 wt %, b2 is 11 wt %; b3 is 30.1 mm$^2$/s, b4 is 0.94 mm$^2$/s; c1 is 125N, c2 is 23.2 cN/cm, c3 is 1.8×10$^8$ Ω·cm, $\mu_s$ is 0.250, $\mu_d$ is 0.272, $\mu_{s1}$ is 0.209, $\mu_{d1}$ is 0.329, d is 14 wt %;

(3) The low-shrinkage polyester industrial yarn is obtained by solid phase polycondensation, melting, melting, metering, extruding, cooling, oiling, drawing, heat setting and winding, wherein E0 is 1.0 dL/g, e is 40 days, the spinning process parameters of low shrinkage polyester industrial yarn are as follows: T1 is 290° C.; T2 is 295° C.; P1 is 165 Bar; T2' is 21° C.; W1 is 75%; V2 is 0.45 m/s; P0 is 0.14 MPa; P2 is 0.18 MPa; V3 is 2600 m/min; tensile, heat setting process parameters are: V4 is 500 m/min; V5 is 520 m/min; T3 is 80° C.; V6 is 1800 m/min; T4 is 100° C.; V7 is 2800 m/min; T5 is 200° C.; V8 is 2800 m/min; T6 is 200° C.; V9 is 2600 m/min; T7 is 150° C.

The finally obtained low shrinkage polyester industrial yarn, wherein D1 is 550 dtex, D2 is −1.5%, Y1 is 7.0 cN/dtex, Y2 is 3.0%, Y3 is 19%, Y4 is −2%, and Y5 is 8.0%. Z1 is 4/m, Z2 is 0.4%, and Z3 is 2.5%.

Example 3

A method for preparing low-shrinkage polyester industrial yarn, comprising the steps:

(1) Preparation of a modified polyester, wherein A' is 1:1.4:0.05, the branched diol is 2-butyl-2-ethyl-1,3-propanediol, the catalyst is antimony acetate, the matting agent is titanium dioxide, and the stabilizer is trimethyl phosphite. B' is 0.1 MPa, C is 252° C., D' is 92%, E is 0.03%, F is 0.23%, G is 0.01%, H is 40 min, I is 495 Pa, J is 263° C., and k is 45 min. L' is 95 Pa, M is 278° C., N is 60 min, O is 0.5 wt %, P is 21000, Q is 2.2, R is 4%, S' is 1.3 wt %, T is 34 wt %, 2-butyl- The structural formula of 2-ethyl-1,3-propanediol is as follows:

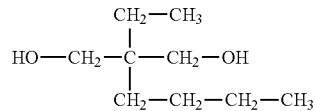

(2) Preparation of an oiling agent for oiling; wherein the crown ether is 2-hydroxymethyl-15-crown-5, the potassium phosphate salt is dodecyl alcohol phosphate potassium salt, and the alkyl sulfonic acid sodium pentadecane Sodium sulfonate, mineral oil is 11 # mineral oil, t1 is 48° C., t2 is 3 h, a1 is 8 parts; a2 is 10 parts; a3 is 85 parts; a4 is 11 parts; a5 is 5 parts; b is 70.83 wt %, b2 is 11 wt %; b3 is 30.1 mm$^2$/s, b4 is 0.94 mm$^2$/s; c1 is 125N, c2 is 23.2 cN/cm, c3 is 1.8×10$^8$ Ω·cm, $\mu_s$ is 0.250, $\mu_d$ is 0.272, $\mu_{s1}$ is 0.209, $\mu_{d1}$ is 0.329, d is 14 wt %;

(3) The low-shrinkage polyester industrial yarn is obtained by solid phase polycondensation, melting, melting, metering, extruding, cooling, oiling, drawing, heat setting and winding, wherein E0 is 1.2 dL/g, and e is 44 days. The spinning process parameters of low shrinkage polyester industrial yarn are as follows: T1 is 320° C.; T2 is 300° C.; P1 is 175 Bar; T2' is 25° C.; W1 is 85%. V2 is 0.65 m/s; P0 is 0.18 MPa; P2 is 0.22 MPa; V3 is 3400 m/min; the process parameters of tensile and heat setting are: V4 is 600 m/min; V5 is 1000 m/min; T3 is 100° C.; V6 2500 m/min; T4 is 150

C.; V7 is 3500 m/min; T5 is 250° C.; V8 is 3500 m/min; T6 is 250° C.; V9 is 3400 m/min; T7 is 220° C.

The finally obtained low shrinkage polyester industrial yarn, wherein D1 is 4400 dtex, D2 is 1.5%, Y1 is 7.1 cN/dtex, Y2 is 2.9%, Y3 is 21%, Y4 is 2%, Y5 is 7.9%, Z1 It is 9/m, Z2 is 0.46%, and Z3 is 2.9%.

Example 4

A method for preparing a low shrinkage polyester industrial yarn, the steps are as follows:

(1) Preparation of modified polyester; wherein T0 is 90° C., A1 is 3,3-diethyl-propanal, A2 is acetaldehyde, A' is 1:1.5:0.06, and the catalyst is antimony trioxide. The matting agent is titanium dioxide, the stabilizer is triphenyl phosphate B' is 0.3 MPa, C is 255° C., D' is 95%, E is 0.04%, F is 0.25%, G is 0.01%; H is 50 min, I is 400 Pa, J is 265° C., k is 33 min, L' is 90 Pa, M is 280° C., N is 50 min, O is 0.2 wt %, P is 23000, Q is 1.9, R is 3.5%, with branched binary The alcohol is 3,3-diethyl-1,5-pentanediol, and the structural formula is as follows:

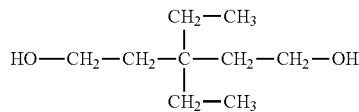

(2) Preparation of an oiling agent for oiling; wherein the crown ether is 2-hydroxymethyl-12-crown-4, the potassium phosphate salt is potassium dodecyl phosphate, and the sodium alkylsulfonate is hexadecane. Sodium sulfonate, mineral oil is 12 # mineral oil, t1 is 40° C., t2 is 2.5 h, a1 is 5 parts; a3 is 95 parts; a4 is 9 parts; a5 is 2 parts; b is 85.58 wt %, b2 is 9 wt %, b3 is 29.5 mm²/s, b4 is 0.93 mm²/s, c1 is 121N, c2 is 24.3 cN/cm, c3 is $1.0 \times 10^8$ Ω·cm, $\mu_s$ is 0.260, $\mu_d$ is 0.263, $\mu_{s1}$ is 0.202, $\mu_{d1}$ is 0.330, d is 19 wt %;

(3) The low-shrinkage polyester industrial yarn is obtained by solid phase polycondensation, melting, melting, metering, extruding, cooling, oiling, drawing, heat setting and winding, wherein E0 is 1.05 dL/g, e is 41 days, the spinning process parameters of low shrinkage polyester industrial yarn are as follows: T1 is 300° C.; e is 298° C.; P1 is 168 Bar; T2' is 22° C.; W1 is 78%; V2 is 0.48 m/s; P0 is 0.15 MPa; P2 is 0.21 MPa; V3 is 2800 m/min; the process parameters of tensile and heat setting are: V4 is 520 m/min; V5 is 700 m/min; T3 is 85° C.; V6 is 2100 m/min; T4 is 120° C.; V7 is 3000 m/min; T5 is 230° C.; V8 is 3000 m/min; T6 is 220° C.; V9 is 2800 m/min; T7 is 170° C.

The finally obtained low shrinkage polyester industrial yarn, wherein D1 is 1100 dtex, D2 is −1.2%, Y1 is 7.2 cN/dtex, Y2 is 2.9%, Y3 is 20.3%, Y4 is −1.4%, and Y5 is 7.8%. Z1 is 5/m, Z2 is 0.5%, and Z3 is 3.8%.

Example 5

A method for preparing a low shrinkage polyester industrial yarn, the steps are as follows:

(1) Preparation of modified polyester; wherein T0 is 91° C., A1 is 4,4-diethyl-butyraldehyde, A2 is propionaldehyde, A' is 1:1.6:0.03, and the catalyst is ethylene glycol antimony. The matting agent is titanium dioxide, the stabilizer is trimethyl phosphate, B' is normal pressure, C is 257° C., D' is 92%, E is 0.05%, F is 0.20%, G is 0.04%, H is 33 min, I 450 Pa, J is 270° C., k is 30 min, L' is 95 Pa, M is 275° C., N is 60 min, O is 0.5 wt %, P is 25000, Q is 2.1, R is 5%, with branched The diol is 4,4-diethyl-1,7-heptanediol, and the structural formula is as follows:

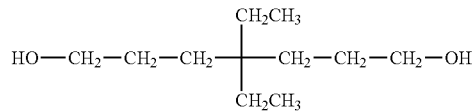

(2) Preparation of oiling agent; wherein the crown ether is 15-crown-5, the phosphate salt is isomeric triol polyoxyethylene ether phosphate potassium salt, and the alkyl sulfonate is dodecyl Sodium sulfonate, mineral oil is 13 # mineral oil, t1 is 52° C., t2 is 2 h, a1 is 10 parts; a2 is 5 parts; a3 is 70 parts; a4 is 8 parts; a5 is 6 parts; b is 70.70 wt %, b2 is 13.5 wt %; b3 is 28.6 mm²/s, b4 is 0.95 mm²/s; c1 is 126N, c2 is 24.9 cN/cm, c3 is $1.2 \times 10^8$ Ω·cm, $\mu_s$ is 0.251, $\mu_d$ is 0.262, $\mu_{s1}$ is 0.202, $\mu_{d1}$ is 0.332, d is 11 wt %;

(3) The low-shrinkage polyester industrial yarn is obtained by solid phase polycondensation, melting, melting, metering, extruding, cooling, oiling, drawing, heat setting and winding, wherein E0 is 1.15 dL/g, e is 43 days, the spinning process parameters of low shrinkage polyester industrial yarn are as follows: T1 is 312° C.; T2 is 298° C.; P1 is 172 Bar; T2' is 24° C.; W1 is 82%; V2 is 0.5 m/s; P0 is 0.17 MPa; P2 is 0.21 MPa; V3 is 3100 m/min; the process parameters of stretching and heat setting are: V4 is 560 m/min; V5 is 800 m/min; T3 is 90° C.; V6 is 2300 m/min; T4 is 130° C.; V7 is 3200 m/min; T5 is 230° C.; V8 is 3200 m/min; T6 is 240° C.; V9 is 3100 m/min; T7 is 210° C.

The finally obtained low shrinkage polyester industrial yarn, wherein D1 is 3000 dtex, D2 is 1.1%, Y1 is 6.6 cN/dtex, Y2 is 2.8%, Y3 is 20.4%, Y4 is 1.2%, Y5 is 7.4%, Z1 It is 8/m, Z2 is 0.69%, and Z3 is 4.8%.

Example 6

A method for preparing a low shrinkage polyester industrial yarn, the steps are as follows:

(1) Preparation of modified polyester; T0 is 92° C., A1 is 4,4-bis(1-methylethyl)-butanal, A2 is propionaldehyde, A' is 1:1.7:0.05, and the catalyst is antimony acetate, the matting agent is titanium dioxide, the stabilizer is trimethyl phosphite, B' is 0.2 MPa, C is 253° C., D' is 96%, E is 0.01%, F is 0.20%, G is 0.05%, H 38 min, I is 480 Pa, J is 262° C., k is 38 min, L' is 98 Pa, M is 279° C., N is 80 min, O is 0.55 wt %, P is 27000, Q is 2.2, R is 4%, with The branched diol is 4,4-bis(1,-methylethyl)-1,7-heptanediol, and the structural formula is as follows:

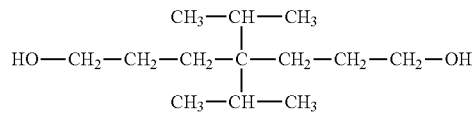

(2) Preparation of an oiling agent for oiling; wherein the crown ether is 2-hydroxymethyl-15-crown-5, the potassium phosphate salt is potassium tetradecyl phosphate, and the sodium alkylsulfonate is fifteen Sodium alkane sulfonate, mineral oil is 14 # mineral oil, t1 is 55° C., t2 is 1 h, a1 is 3 parts; a2 is 10 parts; a3 is 75 parts; a4 is 14 parts; a5 is 7 parts; b is 68.8 wt %, b2 is 12 wt %; b3 is 27.5 mm²/s, b4 is 0.95 mm²/s; c1 is 126N, c2 is 25.4 cN/cm, c3 is $1.6 \times 10^8$ Ω·cm, $\mu_s$ is 0.255, $\mu_d$ is 0.267, $\mu_{s1}$ is 0.203, $\mu_{d1}$ is 0.330, d is 17.5 wt %;

(3) The low-shrinkage polyester industrial yarn is obtained by solid phase polycondensation, melting, melting, metering, extruding, cooling, oiling, drawing, heat setting and winding, wherein E0 is 1.08 dL/g, e is 41 days, the spinning process parameters of low shrinkage polyester industrial yarn are as follows: T1 is 300° C.; T2 is 298° C.; P1 is 168 Bar; T2' is 22° C.; W1 is 78%; V2 is 0.49 m/s; P0 is 0.15 MPa; P2 is 0.21 MPa; V3 is 3050 m/min; tensile, heat setting process parameters are: V4 is 520 m/min; V5 is 700 m/min; T3 is 85° C.; V6 is 2100 m/min; T4 is 120° C.; V7 is 3100 m/min; T5 is 230° C.; V8 is 3100 m/min; T6 is 220° C.; V9 is 3050 m/min; T7 is 170° C.

The final low-shrinkage polyester industrial yarn D1 is 1500 dtex, D2 is −1.0%, Y1 is 7.2 cN/dtex, Y2 is 2.9%, Y3 is 20.3%, Y4 is −1.1%, Y5 is 7.4%, Z1 It is 5/m, Z2 is 0.65%, and Z3 is 3.9%.

Example 7

A method for preparing a low shrinkage polyester industrial yarn, the steps are as follows:

(1) Preparation of modified polyester; wherein T0 is 93° C., A1 is 3,3-dipropyl-propanal, A2 is acetaldehyde, A' is 1:1.8:0.03, and the catalyst is antimony trioxide. The matting agent is titanium dioxide, the stabilizer is triphenyl phosphate, B' is 0.3 MPa, C is 250° C., D' is 90%, E is 0.03%, F is 0.24%, G is 0.02%, H is 42 min, I is 455 Pa, J is 264° C., k is 45 min, L' is 85 Pa, M is 285° C., N is 75 min, O is 0.45 wt %, P is 26500, Q is 2.2, R is 4.5%, with branched The diol is 3,3-dipropyl-1,5-pentanediol, and the structural formula is as follows:

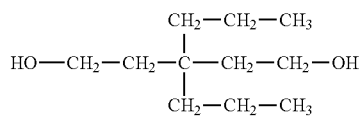

(2) Preparation of an oiling agent for oiling; wherein the crown ether is 15-crown-5, the potassium phosphate is potassium dodecyl phosphate, and the sodium alkylsulfonate is sodium hexadecylsulfonate. The mineral oil is 15 # mineral oil, t1 is 41° C., t2 is 2 h, a1 is 8 parts; a2 is 20 parts; a3 is 100 parts; a4 is 15 parts; a5 is 2 parts; b is 68.97 wt %, b2 is 8.5 wt %; b3 is 28.4 mm$^2$/s, b4 is 0.94 mm$^2$/s; c1 is 122N, c2 is 26.8 cN/cm, c3 is 1.8×10$^8$ Ω·cm, $\mu_s$ is 0.263, $\mu_d$ is 0.268, $\mu_{s1}$ is 0.210, $\mu_{d1}$ is 0.320, d is 16 wt %;

(3) The low-shrinkage polyester industrial yarn is obtained by solid phase polycondensation, melting, melting, metering, extruding, cooling, oiling, drawing, heat setting and winding, wherein E0 is 1.09 dL/g, e is 41 days, the spinning process parameters of low shrinkage polyester industrial yarn are as follows: T1 is 300° C.; T2 is 298° C.; P1 is 168 Bar; T2' is 22° C.; W1 is 78%; V2 is 0.52 m/s; P0 is 0.15 MPa; P2 is 0.20 MPa; V3 is 2800 m/min; the process parameters of tensile and heat setting are: V4 is 520 m/min; V5 is 700 m/min; T3 is 85° C.; V6 is 2100 m/min; T4 is 120° C.; V7 is 2900 m/min; T5 is 230° C.; V8 is 2900 m/min; T6 is 210° C.; V9 is 2800 m/min; T7 is 170° C.

The finally obtained low shrinkage polyester industrial yarn, wherein D1 is 1800 dtex, D2 is −0.8%, Y1 is 7.2 cN/dtex, Y2 is 2.9%, Y3 is 20.3%, Y4 is −0.7%, and Y5 is 7.3%. Z1 is 5/m, Z2 is 0.80%, and Z3 is 4.65%.

Example 8

A method for preparing a low shrinkage polyester industrial yarn, the steps are as follows:

(1) Preparation of modified polyester; T0 is 94° C., A1 is 4,4-dipropyl-butyraldehyde, A2 is acetaldehyde, A' is 1:1.9:0.04, the catalyst is ethylene glycol antimony, extinction The agent is titanium dioxide, the stabilizer is trimethyl phosphate, B' is 0.3 MPa, C is 260° C., D' is 93%, E is 0.04%, F is 0.21%, G is 0.03%, H is 45 min, I is 475 Pa, J is 265° C., k is 48 min, L' is 88 Pa, M is 283° C., N is 80 min, O is 0.6 wt %, P is 23000, Q is 2.0, R is 3%, with branched binary The alcohol is 4,4-dipropyl-1,7-heptanediol, and the structural formula is as follows:

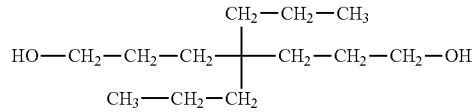

(2) Preparation of the oil agent for oiling, wherein the crown ether is 2-hydroxymethyl-12-crown-4, the potassium phosphate salt is potassium tetradecyl phosphate, and the sodium alkylsulfonate is fifteen Sodium alkane sulfonate, mineral oil is 16 # mineral oil, t1 is 45° C., t2 is 3 h, a1 is 9 parts; a3 is 80 parts; a4 is 12 parts; a5 is 5 parts; b is 83.33 wt %, b2 is 14 wt %; b3 is 30.0 mm$^2$/s, b4 is 0.93 mm$^2$/s; c1 is 127N, c2 is 23.5 cN/cm, c3 is 1.5×10$^8$ Ω·cm, $\mu_s$ is 0.262, $\mu_d$ is 0.273, $\mu_{s1}$ is 0.2038, $\mu_{d1}$ is 0.328, d is 18 wt %;

(3) The low-shrinkage polyester industrial yarn is obtained by solid phase polycondensation, melting, melting, metering, extruding, cooling, oiling, drawing, heat setting and winding, wherein E0 is 1.12 dL/g, e is 41 days, the spinning process parameters of low shrinkage polyester industrial yarn are as follows: T1 is 300° C.; T2 is 298° C.; P1 is 168 Bar; T2' is 22° C.; W1 is 78%; V2 is 0.52 m/s; P0 is 0.15 MPa; P2 is 0.21 MPa; V3 is 3200 m/min; tensile, heat setting process parameters are: V4 is 520 m/min; V5 is 700 m/min; T3 is 85° C.; V6 is 2100 m/min; T4 is 120° C.; V7 is 3300 m/min; T5 is 230° C.; V8 is 3300 m/min; T6 is 230° C.; V9 is 3200 m/min; T7 is 170° C.

The finally obtained low shrinkage polyester industrial yarn, wherein D1 is 1900 dtex, D2 is −1.2%, Y1 is 7.2 cN/dtex, Y2 is 2.9%, Y3 is 20.3%, Y4 is −1.4%, and Y5 is 7.8%. Z1 is 5/m, Z2 is 0.5%, and Z3 is 4.7%.

Example 9

A method for preparing a low shrinkage polyester industrial yarn, the steps are as follows:

(1) Preparation of modified polyester; T0 is 95° C., A1 is 4-methyl-4-(1,1-dimethylethyl)-butanal, A2 is propionaldehyde, and A' is 1:2.5:0.05, the catalyst is antimony acetate, the matting agent is titanium dioxide, the stabilizer is trimethyl phosphate, B' is atmospheric pressure, C is 251° C., D' is 96%, E is 0.05%, F is 0.22%, G is 0.04%, H is 30 min, I is 420 Pa, J is 267° C., k is 50 min, L' is 80 Pa, M is 280° C., N is 90 min, O is 0.25 wt %, P is 24000, Q is 2.2, R is 4%, the branched diol is 4-methyl-4-(1,1-dimethylethyl)-1,7-heptanediol, and the structural formula is as follows:

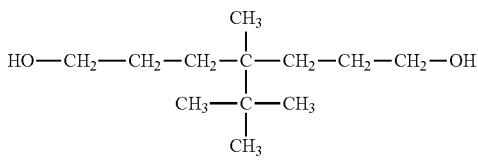

(2) Preparation of an oiling agent for oiling; wherein the crown ether is 2-hydroxymethyl-15-crown-5, the potassium phosphate salt is potassium dodecyl phosphate, and the sodium alkylsulfonate is dodecane sodium sulfonate, t1 is 55° C., t2 is 1 h, a2 is 15 parts; a3 is 90 parts; a4 is 8 parts; a5 is 7 parts; b is 81.81 wt %, b2 is 10 wt %; b3 is 29.7 mm²/s, b4 is 0.94 mm²/s; c1 is 126N, c2 is 24.8 cN/cm, c3 is $1.8 \times 10^8$ Ω·cm, $\mu_s$ is 0.250, $\mu_d$ is 0.264, $\mu_{s1}$ is 0.210, $\mu_{d1}$ is 0.321, d is 14 wt %;

(3) The low-shrinkage polyester industrial yarn is obtained by solid phase polycondensation, melting, melting, metering, extruding, cooling, oiling, drawing, heat setting and winding, wherein E0 is 1.17 dL/g, e is 43 days, the spinning process parameters of low shrinkage polyester industrial yarn are as follows: T1 is 312° C.; T2 is 298° C.; P1 is 175 Bar; T2' is 23° C.; W1 is 82%; V2 is 0.5 m/s; P0 is 0.17 MPa; P2 is 0.21 MPa; V3 is 3100 m/min; the process parameters of stretching and heat setting are: V4 is 560 m/min; V5 is 800 m/min; T3 is 90° C.; V6 is 2300 m/min; T4 is 130° C.; V7 is 3200 m/min; T5 is 230° C.; V8 is 3200 m/min; T6 is 210° C.; V9 is 3100 m/min; T7 is 210° C.

The finally obtained low shrinkage polyester industrial yarn, wherein D1 is 2800 dtex, D2 is 0.25%, Y1 is 6.5 cN/dtex, Y2 is 2.85%, Y3 is 20.5%, Y4 is 0.4%, Y5 is 7.5%, Z1 It is 8/m, Z2 is 0.75%, and Z3 is 4.6%.

Example 10

A method for preparing a low shrinkage polyester industrial yarn, the steps are as follows:

(1) Preparation of modified polyester; T0 is 90° C., A1 is 3-methyl-3-pentyl-propanal, A2 is propionaldehyde, A' is 1:1.2:0.06, and the catalyst is ethylene glycol antimony. The matting agent is titanium dioxide, the stabilizer is trimethyl phosphite, B' is 0.1 MPa, C is 255° C., D' is 92%, E is 0.01%, F is 0.20%, G is 0.01%, H is 50 min. I is 490 Pa, J is 269° C., k is 30 min, L' is 100 Pa, M is 281° C., N is 55 min, O is 0.1 wt %, P is 20000, Q is 1.9, R is 3.5%, with branching The diol is 3-methyl-3-pentyl-1,6-hexanediol, and the structural formula is as follows:

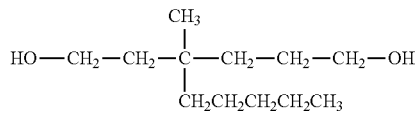

(2) Preparation of an oiling agent for oiling; wherein the crown ether is 2-hydroxymethyl-12-crown-4, the potassium phosphate salt is potassium dodecyl phosphate, and the sodium alkylsulfonate is dodecane Sodium sulfonate, mineral oil is 9 # mineral oil, t1 is 40° C., t2 is 1 h; a1 is 2 parts, a2 is 10 parts; a3 is 90 parts; a4 is 8 parts; a5 is 3 parts; b is 79.6 wt %, b2 is 14.5 wt %; b3 is 29.6 mm²/s, b4 is 0.93 mm²/s; c1 is 125N, c2 is 24.8 cN/cm, c3 is $1.3 \times 10^8$ Ω·cm, $\mu_s$ is 0.255, $\mu_d$ is 0.266, $\mu_{s1}$ is 0.203, $\mu_{d1}$ is 0.320, d is 14 wt %;

(3) The low-shrinkage polyester industrial yarn is obtained by solid phase polycondensation, melting, melting, metering, extruding, cooling, oiling, drawing, heat setting and winding, wherein E0 is 1.14 dL/g, e is 43 days, the spinning process parameters of low shrinkage polyester industrial yarn are as follows: T1 is 312° C.; T2 is 298° C.; P1 is 175 Bar; T2' is 24° C.; W1 is 82%; V2 is 0.5 m/s; P0 is 0.17 MPa; P2 is 0.21 MPa; V3 is 3100 m/min; the process parameters for tensile and heat setting are: V4 is 560 m/min; V5 is 700 m/min; T3 is 90° C.; V6 is 2300 m/min; T4 is 130° C.; V7 is 3200 m/min; T5 is 230° C.; V8 is 3200 m/min; T6 is 230° C.; V9 is 3100 m/min; T7 is 210° C.

The finally obtained low shrinkage polyester industrial yarn, wherein D1 is 2300 dtex, D2 is 0.4%, Y1 is 6.4 cN/dtex, Y2 is 2.9%, Y3 is 20.4%, Y4 is 0.5%, Y5 is 7.4%, Z1 It is 8/m, Z2 is 0.76%, and Z3 is 4.7%.

Example 11

A method for preparing a low shrinkage polyester industrial yarn, the steps are as follows:

(1) Preparation of modified polyester; T0 is 95° C., A1 is 3,3-dipentyl-propanal, A2 is acetaldehyde, A' is 1:2.0:0.03, the catalyst is antimony acetate, and the matting agent is Titanium dioxide, stabilizer is trimethyl phosphite, B' is 0.2 MPa, C is 250° C., D' is 97%, E is 0.01%, F is 0.23%, G is 0.05%, H is 45 min, I is 500 Pa, J is 260° C., k is 40 min, L' is 92 Pa, M is 277° C., N is 80 min, O is 0.35 wt %, P is 25500, Q is 1.8, R is 5%, branched diol It is 3,3-dipentyl-1,5-pentanediol, and its structural formula is as follows:

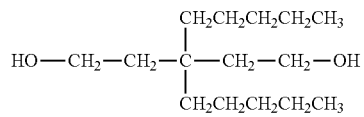

(2) Preparation of an oiling agent; wherein the crown ether is 2-hydroxymethyl-12-crown-4, the potassium phosphate salt is potassium dodecyl phosphate, and the sodium alkylsulfonate is dodecane Sodium sulfonate, mineral oil is 12 # mineral oil, t1 is 40° C., t2 is 2.5 h, a1 is 5 parts; a3 is 95 parts; a4 is 9 parts; a5 is 2 parts; b is 85.58 wt %, b2 is 9 wt %; b3 is 29.5 mm²/s, b4 is 0.93 mm²/s; c1 is 121N, c2 is 24.3 cN/cm, c3 is $1.0 \times 10^8$ Ω·cm, $\mu_s$ is 0.260, $\mu_d$ is 0.263, $\mu_{s1}$ is 0.202, $\mu_{d1}$ is 0.330, d is 18 wt %;

(3) The low-shrinkage polyester industrial yarn is obtained by solid phase polycondensation, melting, melting, metering, extruding, cooling, oiling, drawing, heat setting and winding, wherein E0 is 1.18 dL/g, e is 43 days, the spinning process parameters of low shrinkage polyester industrial yarn are as follows: T1 is 312° C.; T2 is 298° C.; P1 is 170 Bar; T2' is 24° C.; W1 is 82%; V2 is 0.5 m/s; P0 is 0.17 MPa; P2 is 0.21 MPa; V3 is 3100 m/min; the process parameters of tensile and heat setting are: V4 is 560 m/min; V5 is 900 m/min; T3 is 90° C.; V6 is 2300 m/min; T4 is 130° C.; V7 is 3200 m/min; T5 is 230° C.; V8 is 3200 m/min; T6 is 240° C.; V9 is 3100 m/min; T7 is 210° C.

The finally obtained low shrinkage polyester industrial yarn, wherein D1 is 3200 dtex, D2 is 0.35%, Y1 is 6.6 cN/dtex, Y2 is 2.8%, Y3 is 20.4%, Y4 is 0.4%, Y5 is 7.4%, Z1 It is 8/m, Z2 is 0.77%, and Z3 is 4.65%.

What is claimed is:

1. A low-shrinkage polyester industrial yarn, wherein the low-shrinkage polyester industrial yarn is made of a modified polyester, and a molecular chain of the modified polyester comprises a terephthalic acid segment, an ethylene glycol segment and a branched diol segment; a structural formula of the branched diol segment is as follows:

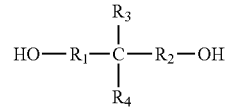

wherein each of $R_1$ and $R_2$ is selected from a linear alkylene group having 1-3 carbon atoms, $R_3$ is selected from an alkyl group having 1-5 carbon atoms, and R4 is selected from an alkyl group having 2-5 carbon atoms;

a dry heat shrinkage of the low-shrinkage polyester industrial yarn is 2.5-4.7% under an environment of 190° C., 15 min and 0.01 cN/dtex.

2. The low-shrinkage polyester industrial yarn of claim 1, wherein the low-shrinkage polyester industrial yarn has a fineness of 550-4400 dtex, a linear density deviation rate of ±1.5%, a breaking strength larger than 7.0 cN/dtex, a breaking strength CV value lower than 3.0%, an elongation at break center value of 19.0-21.0%, an elongation at break deviation rate of ±2.0%, an elongation at break CV value lower than 8.0%, a network of 4-9 units/m, and an oil content of 0.60±0.20%.

3. The low-shrinkage polyester industrial yarn of claim 2, wherein a content of a cyclic oligomer in the modified polyester is less than or equal to 0.6 wt %;
the modified polyester has a number average molecular weight of 20,000-27,000 and a molecular weight distribution index of 1.8-2.2;
a molar content of the branched diol segment in the modified polyester is 3-5% of a molar content of the terephthalic acid segment;
the branched diol segment is 2-ethyl-2-methyl-1,3-propanediol; 2,2-diethyl-1,3-propanediol; 2-butyl-2-ethyl-1,3-propanediol; 3,3-diethyl-1,5-pentanediol; 4,4-diethyl-1,7-heptanediol; 4,4-di(1,-methylidene)-1,7-heptanediol; 3,3-dipropyl-1,5-pentanediol; 4,4-dipropyl-1,7-heptanediol; 4-methyl-4-(1,1-dimethylethyl)-1,7-heptanediol; 3-methyl-3-pentyl-1,6-hexanediol or 3,3-dipentyl-1,5-pentylene diol.

4. The low-shrinkage polyester industrial yarn of claim 1, wherein a content of a cyclic oligomer in the modified polyester is less than or equal to 0.6 wt %;
the modified polyester has a number average molecular weight of 20,000-27,000 and a molecular weight distribution index of 1.8-2.2;
a molar content of the branched diol segment in the modified polyester is 3-5% of a molar content of the terephthalic acid segment;
the branched diol segment is 2-ethyl-2-methyl-1,3-propanediol; 2,2-diethyl-1,3-propanediol; 2-butyl-2-ethyl-1,3-propanediol; 3,3-diethyl-1,5-pentanediol; 4,4-diethyl-1,7-heptanediol; 4,4-di(1,-methylidene)-1,7-heptanediol; 3,3-dipropyl-1,5-pentanediol; 4,4-dipropyl-1,7-heptanediol; 4-methyl-4-(1,1-dimethylethyl)-1,7-heptanediol; 3-methyl-3-pentyl-1,6-hexanediol or 3,3-dipentyl-1,5-pentylene diol.

5. The low-shrinkage polyester industrial yarn of claim 4, wherein the modified polyester is prepared by: uniformly mixing terephthalic acid, ethylene glycol, and a branched diol to obtain a slurry;
then performing an esterification reaction and a polycondensation reaction on the slurry to obtain the modified polyester;
(1) the esterification reaction comprises:
uniformly stirring the terephthalic acid, the ethylene glycol and the branched diol into the slurry;
adding a catalyst and a stabilizer into the slurry to obtain a first mixture;
carrying out the esterification reaction on the first mixture under a nitrogen atmosphere to obtain a second mixture, wherein during the esterification reaction, a first pressure is increased from a normal pressure to 0.3 MPa, a temperature is 250-260° C., and the esterification reaction ends when a water distillation amount in the esterification reaction reaches large than or equal to 90% of a theoretical value;
(2) the polycondensation reaction comprises:
after the esterification reaction ends, carrying out a low vacuum stage of the polycondensation reaction on the second mixture under a condition of negative pressure; wherein during the low vacuum stage of the polycondensation reaction, a second pressure is pumped smoothly from the normal pressure to a first absolute pressure under 500 Pa in 30-50 min, a first reaction temperature is 260-270° C., and a first reaction time is 30-50 min; then continuously vacuuming, and carrying out a high vacuum stage of the polycondensation reaction on the second mixture to obtain the modified polyester, wherein during the high vacuum stage of the polycondensation reaction, a third pressure is further reduced to a second absolute pressure under 100 Pa, a second reaction temperature is 275-285° C., a second reaction time is 50-90 min.

6. The low-shrinkage polyester industrial yarn of claim 5, wherein a molar ratio of the terephthalic acid, the ethylene glycol to the branched diol is 1:(1.2-2.0): (0.03-0.06), the catalyst is added in an amount of 0.01-0.05% by weight of the terephthalic acid, and the stabilizer is added in an amount of 0.01-0.05% by weight of the terephthalic acid;
the catalyst is antimony trioxide, ethylene glycol antimony or antimony acetate, and the stabilizer is triphenyl phosphate, trimethyl phosphate or trimethyl phosphite.

7. A method for preparing the low-shrinkage polyester industrial yarn of claim 1, comprising performing solid phase polycondensation, melting, metering, extruding, cooling, oiling, drawing, heat setting and winding on the modified polyester;
wherein an oil agent in the oiling contains a crown ether, and a content of the crown ether is 30-85.58 wt%;
wherein the oil agent is dispersed in water to obtain an emulsion having a concentration of 14-18% by weight.

8. The method of claim 6, wherein an intrinsic viscosity of the modified polyester after the solid phase polycondensation is 1.0-1.2 dL/g; and a replacement cycle of a spinning assembly is greater than or equal to 40 days.

9. The method of claim 7, wherein a heat loss of the oil agent is less than 15 wt% after the oil agent is heat-treated at 200 ° C. for 2 hours;
the oil agent has a kinematic viscosity of 27.5-30.1mm$^2$/s at (50 ±0.01) ° C., and the kinematic viscosity of the oil agent after being disposed in a concentration of 10 wt% is 0.93-0.95 mm$^2$/s;
an oil film strength of the oil agent is 121-127 N;
a surface tension of the oil agent is 23.2-26.8 cN/cm, and a specific resistance of the oil agent is $1.0 \times 10^8$-$1.8 \times 10^8$ Ωcm;
after the oiling, a static friction coefficient between the low-shrinkage polyester industrial yarns is 0.250-0.263, and a dynamic friction coefficient between the low- shrinkage polyester industrial yarns is 0.262-0.273;
after the oiling, a static friction coefficient between the low-shrinkage polyester industrial yarn and a metal is 0.202-0.210, and a dynamic friction coefficient between the low-shrinkage polyester industrial yarn and the metal is 0.320-0.332;
the crown ether is 2-hydroxymethyl-12-crown-4, 15-crown-5 or 2-hydroxymethyl-15-crown-5;

the oil agent further comprises a mineral oil, a potassium phosphate salt, a trimethylolpropane laurate and a sodium alkyl sulfonate;

the mineral oil is one selected from the group consisting of mineral oils of 94-174;

the potassium phosphate salt is a potassium salt of lauryl phosphate, an isomeric tridecyl polyoxyethylene ether phosphate potassium salt or a tetradecyl alcohol phosphate potassium salt;

the sodium alkyl sulfonate is sodium dodecyl sulfate, sodium pentadecyl sulfonate or sodium hexadecyl sulfonate.

10. The method of claim 8, wherein a method for preparing the oil agent comprises uniformly mixing the crown ether, the potassium phosphate salt, the trimethylolpropane laurate and the sodium alkylsulfonate obtain a mixture;

adding the mixture to the mineral oil and stirring to obtain the oil agent; wherein an amount of each of the mineral oil, the phosphate potassium salt, the trimethylolpropane laurate, the crown ether, and the sodium alkyl sulfonate by weight is as follows:

mineral oil 0-10 parts;
trimethylolpropane laurate 0-20 parts;
crown ether 70-100 parts;
phosphate potassium salt 8-15 parts;
sodium alkyl sulfonate 2-7 parts;

the mixing is carried out at a normal temperature, a temperature of the stirring is 40 to 55 ° C., and a time of the stirring is 1 hour to 3 hours.

11. The method of claim 9, wherein a plurality of spinning process parameters of the low-shrinkage polyester industrial yarn are as follows:

a temperature of each zone of a screw is 290-320 ° C.;
a temperature of a cabinet is 295-300° C.;
a head pressure is 170 ±5 Bar;
a side blowing temperature is 23 ±2 ° C.;
a side blowing humidity is 80 ±5%;
a side blowing air velocity is 0.55±0.10m/s;
a pre-network pressure is 0.16±0.02MPa;
network pressure is 0.20±0.02MPa;
a winding speed is 2600-3400m/min;
process parameters for stretching and the heat setting are:
GR-1 speed is 500-600m/min;
GR-2 speed is 520-1000m/min; GR-2 temperature is 80-100° C.;
GR-3 speed is 1800-2500m/min; GR-3 temperature is 100-150° C.;
GR-4 speed is 2800-3500m/min; GR-4 temperature is 200-250° C.;
GR-5 speed is 2800-3500m/min; GR-5 temperature is 200-250° C.;
GR-6 speed is 2600-3400m/min; GR-6 temperature is 150-220° C.

12. The method of claim 7, wherein the low-shrinkage polyester industrial yarn has a fineness of 550-4400 dtex, a linear density deviation rate of ±1.5%, a breaking strength larger than 7.0 cN/dtex, a breaking strength CV value lower than 3.0%, an elongation at break center calue of 19.0-21.0%, an elongation at break deviation rate of ±2.0%, an elongation at break CV value lower than 8.0%, a network of 4-9units/ m, and an oil content of 0.60±0.20%.

13. The method of claim 7, wherein a content of a cyclic oligomer in the modified polyester is less than or equal to 0.6 wt%;

the modified polyester has a number average molecular weight of 20,000-27,000 and a molecular weight distribution index of 1.8-2.2;

a molar content of the branched diol segment in the modified polyester is 3-5% of a molar content of the terephthalic acid segment;

the branched diol segment is 2-ethyl-2-methyl-1,3-propanediol; 2,2-diethyl-1,3- propanediol; 2-butyl-2-ethyl-1,3-propanediol; 3 ,3 -diethy 1-1,5-pentanediol ; 4,4-diethyl- 1,7-heptanediol; 4,4-di (1 ,-methylidene)-1,7-heptanediol; 3,3 -dipropyl-1,5-pentanediol;

4,4-dipropyl-1,7-heptanediol; 4-methyl-4-(1,1-dimethylethyl)-1,7-heptanediol; 3-methyl- 3-pentyl-1,6-hexanediol or 3,3-dipentyl-1,5-pentylene diol.

14. The method of claim 13, wherein the modified polyester is prepared by: uniformly mixing terephthalic acid, ethylene glycol, and a branched diol to obtain a slurry;

then performing an esterification reaction and a polycondensation reaction on the slurry to obtain the modified polyester;

(1) the esterification reaction comprises:
uniformly stirring the terephthalic acid, the ethylene glycol and the branched diol into the slurry;
adding a catalyst and a stabilizer into the slurry to obtain a first mixture;
carrying out the esterification reaction on the first mixture under a nitrogen atmosphere to obtain a second mixture, wherein during the esterification reaction, a first pressure is increased from a normal pressure to 0.3 MPa, a temperature is 250-260 ° C., and the esterification reaction ends when a water distillation amount in the esterification reaction reaches large than or equal to 90% of a theoretical value;

(2) the polycondensation reaction comprises:
after the esterification reaction ends, carrying out a low vacuum stage of the polycondensation reaction on the second mixture under a condition of negative pressure;
wherein during the low vacuum stage of the polycondensation reaction, a second pressure is pumped smoothly from the normal pressure to a first absolute pressure under 500 Pa in 30-50 min, a first reaction temperature is 260-270 ° C., and a first reaction time is 30-50min;
then continuously vacuuming, and carrying out a high vacuum stage of the polycondensation reaction on the second mixture to obtain the modified polyester, wherein during the high vacuum stage of the polycondensation reaction, a third pressure is further reduced to a second absolute pressure under 100Pa, a second reaction temperature is 275-285 ° C., a second reaction time is 50-90 min.

15. The method of claim 14, wherein a molar ratio of the terephthalic acid, the ethylene glycol to the branched diol is 1:(1.2-2.0): (0.03-0.06), the catalyst is added in an amount of 0.01-0.05% by weight of the terephthalic acid, and the stabilizer is added in an amount of 0.01-0.05% by weight of the terephthalic acid;

the catalyst is antimony trioxide, ethylene glycol antimony or antimony acetate, and the stabilizer is triphenyl phosphate, trimethyl phosphate or trimethyl phosphite.

* * * * *